United States Patent [19]
Silverman et al.
[11] 4,229,248
[45] Oct. 21, 1980

[54] PROCESS FOR FORMING BONDING PADS ON MAGNETIC BUBBLE DEVICES

[75] Inventors: Peter J. Silverman; Donald K. Rose, both of Palo Alto, Calif.
[73] Assignee: Intel Magnetics, Inc., Santa Clara, Calif.

[21] Appl. No.: 27,669
[22] Filed: Apr. 6, 1979
[51] Int. Cl.[3] ........................ B44C 1/22; B29C 17/08; C03C 15/00; C03C 25/06
[52] U.S. Cl. ...................................... 156/653; 134/34; 156/643; 156/657; 156/668; 365/29; 357/27
[58] Field of Search ............... 156/643, 653, 655, 657, 156/668, 656, 659; 134/34, 2; 427/89, 90, 130–132; 365/1-3, 29; 357/27; 29/574, 591

[56] References Cited

U.S. PATENT DOCUMENTS

| | | | |
|---|---|---|---|
| 3,740,819 | 6/1973 | Babusci et al. | 156/654 X |
| 3,858,304 | 1/1975 | Leedy et al. | 29/591 X |
| 3,863,333 | 2/1975 | Loya | 156/657 X |
| 3,957,552 | 5/1976 | Ahn et al. | 156/656 X |
| 3,959,047 | 5/1976 | Alberts et al. | 156/656 |
| 4,057,659 | 11/1977 | Pammer et al. | 156/656 X |

*Primary Examiner*—William A. Powell
*Attorney, Agent, or Firm*—Blakely, Sokoloff, Taylor & Zafman

[57] ABSTRACT

A process for thickening the relatively thin bonding pads of a single wall magnetic domain (bubble) device is disclosed. The process is particularly suited for thickening the pads defined by a buried metal layer, such as the conductive layer often disposed between the magnet garnet layer and permalloy layer. Windows are etched through a polyimide scratch protection layer to expose underlying bonding pads. A layer of gold is formed over this protective layer and over the exposed pads. The gold layer is washed away from the protective layer. Since the gold adheres only to the bonding pads, it remains to build up the thickness of these pads.

10 Claims, 3 Drawing Figures

PROCESS FOR FORMING BONDING PADS ON MAGNETIC BUBBLE DEVICES

BACKGROUND OF THE INVENTION

1. Field of the Invention

The invention relates to the field of bonding pads for magnetic bubble devices.

2. Prior Art

In the fabrication of single wall magnetic domain devices such as bubble memories, a plurality of layers are formed over the magnetic garnet layer. Typically a plurality of conductors are defined from a metal layer disposed over an insulative layer which insulates these conductors from the garnet layer. Permalloy elements are formed above this metal layer on another insulative layer such as a silicon dioxide layer. Then, to protect the permalloy elements, a scratch protection layer such as a glass layer is formed over the permalloy elements.

It is generally necessary to provide electrical contact to bonding pads formed from both the metal layer and permalloy layer. Ordinary masking and etching steps are employed to etch through the scratch protection layer and other insulative layers to expose these underlying bonding pads. Before actually bonding, however, these pads are subjected to the impact of probes for testing the plurality of devices formed on a wafer. This testing identifies acceptable devices before the bonding stage, to prevent the wasteful packaging and bonding of unacceptable devices.

The bonding pads, particularly those defined from the metal layer, are relatively thin, for example, 5,000 Å thick. This thin layer is employed to provide a somewhat planar surface for the subsequent layers. The bonding pads defined from this metal layer are easily damaged by a probe tester and, to a lesser extent, by a bonding device. This problem, while not as severe, also occurs for the permalloy bonding pads.

Generally, two approaches have been taken to this problem. One approach is to accept the thin bonding pads and attempt to reduce the losses from the probe tester. A second approach is to build up the thickness of these bonding pads by depositing a metal layer such as a chromium gold layer on the scratch protection layer and exposed pads. This layer is then masked and etched to leave additional metal on only the bonding pads. While this latter approach provides thicker bonding pads, a reduction in yield results because of the additional masking and etching step.

As will be seen, the present invention provides a process for thickening these bonding pads without the additional masking and etching step required by prior art processes.

SUMMARY OF THE INVENTION

A process for increasing the thickness of a metal region in a magnetic bubble device is disclosed. These devices typically include a first layer of material in which magnetic bubbles are moved. A second layer which includes the region to be thickened is covered by an overlying protective layer. The protective layer is etched to expose the underlying region. A gold layer is formed on the protective layer and the exposed underlying region. The gold is then washed away in a washing step. The gold is easily washed away from the protective layer; however, it adheres to the region. In this manner, the region is thickened with gold from the gold layer without requiring a masking step and etching step.

DETAILED DESCRIPTION OF THE INVENTION

A process for increasing the thickness of bonding pads in a single wall domain magnetic arrangement, commonly referred to as a magnetic bubble device, is disclosed. In the following description, numerous specific details such as specific materials and thicknesses are set forth to provide a thorough understanding of the present invention. However, it will be obvious to one skilled in the art that these specific details need not be used to practice the invention. In other instances, well-known steps are not described in detail in order not to obscure the present invention in unnecessary detail.

Figure 1:
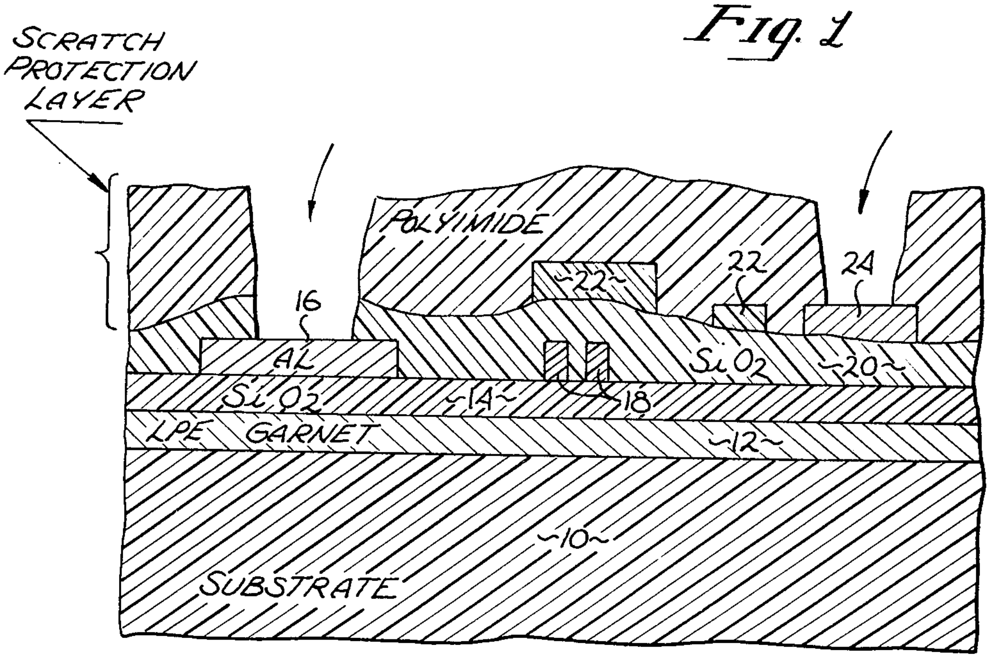
FIG. 1 is a cross-sectional elevation view of a magnetic bubble device which includes a substrate, layer of magnetic garnet material, first insulative layer, conductive members defined from a conductive layer, a second insulative layer, permalloy elements defined from a permalloy layer, and an overlying scratch protection layer. This FIGURE illustrates exposed underlying bonding pads.

Referring now to FIG. 1, a cross-section of a typical magnetic bubble device, such as a magnetic bubble memory, is illustrated. The device is fabricated on a substrate 10, such as a gadolinium gallium garnet ($Gd_3Ga_{15}O_{12}$) substrate. An ion implanted magnetic garnet (epitaxial layer 12) is formed on this substrate to provide a layer in which magnetic bubbles are sustained and moved. An insulating layer such as the silicon dioxide layer 14 is formed over the layer 12. Then a conductive layer such as an aluminum layer is formed on the insulating layer 14. A plurality of conductive paths and members are defined from this aluminum layer such as the bonding pad 16 and the elements 18. A second insulative layer 20 ($SiO_2$) is formed above the conductive layer. A plurality of permalloy elements are defined from a permalloy layer disposed above layer 20, such as elements 22 and the bonding pad 24.

In the fabrication of the device of FIG. 1, the metal layer is generally thin in order to provide a relatively planar surface for subsequent layers. As mentioned, this layer is typically approximately 5,000 Å thick.

To protect particularly the permalloy elements, a scratch protection layer is formed over the permalloy elements. This layer is typically a glass layer or a silicon nitride layer. However, in the presently preferred embodiment, a layer of an organic material, polyimide, is employed. The thickness of the layer is not critical; in the presently preferred embodiment a thickness of approximately 2.0 microns is employed. The polyimides and methods of applying them are described in detail in U.S. Pat. No. 3,179,634.

After the scratch protection layer has been formed over the permalloy members and the insulative layer 20, a masking and etching step are employed to expose the underlying bonding pads, including both the permalloy bonding pad 24 and aluminum bonding pad 16. As shown in FIG. 1, the windows 26 and 28 are etched to expose the bonding pads 16 and 24, respectively. Note that in the case of the pad 16, in addition to etching the polyimide layer 30, a second etching step is necessary to etch the portion of the silicon dioxide layer 20 covering the bonding pad 16. In the presently preferred embodiment, a plasma etching step is employed to etch through the silicon dioxide layer 20.

In applications where the scratch protection layer 30 is a glass layer or silicon nitride layer, ordinary etchants may be employed to define the windows 26 and 28. In the presently preferred embodiment where the polyimide layer 30 is employed, a photoresist layer is first formed on the polyimide layer and exposed in a well-known manner. The ordinary developer used to develop the photoresist also etches the polyimide, thus eliminating a separate etching step to define the window 28 and the portion of the window 26 which passes through the layer 30.

Figure 2:
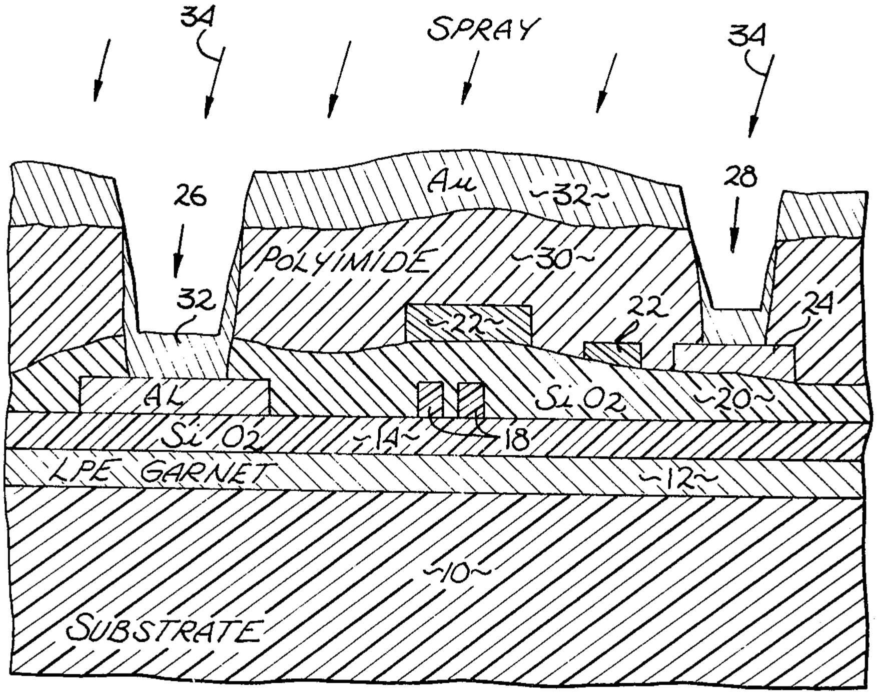
FIG. 2 illustrates the device of FIG. 1 after a gold layer is formed over the device. This FIGURE also illustrates a washing step which is employed to wash away portions of the gold layer.

Referring now to FIG. 2, a gold layer 32, which may be 3,000 to 10,000 Å thick, is vacuum deposited, for example, by employing well-known sputtering techniques, onto the protective layer 30. Note that the gold is also deposited into the windows 26 and 28 and thus is formed on the bonding pads.

Next, as shown in FIG. 2, the device and in particular the gold layer 32 is subjected to a high-pressure water spray, as shown by lines 34. Other inert liquids which do not react with the materials of the device may be employed in lieu of water. The spray washes the gold from the polyimide 30; however, the gold remains on the bonding pads 16 and 24. It should be noted that the gold does not easily adhere to the polyimide or, for that matter, to other commonly employed protective layers, such as a silicon dioxide or silicon nitride layer. On the other hand, the gold adheres to the aluminum of the bonding pad 16 and to the permalloy of the bonding pad 24 and thus does not wash away in this washing step. In lieu of spraying, the gold may be washed from the polyimide 30 by subjecting the device to an ultrasonic bath. Other well-known washing means may be employed, for example, the device may be placed in a wafer scrubber which scrubber is used to clean wafers with fluid action.

Figure 3:
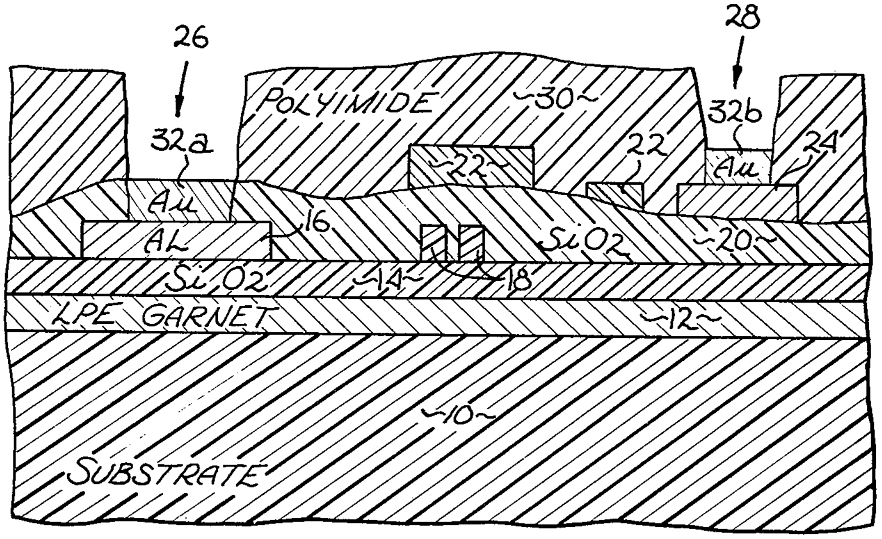
FIG. 3 illustrates the substrate of FIG. 2 after the gold is washed away from the protective layer leaving the thickened bonding pads.

The resultant structure is shown in FIG. 3. The gold which adhered to the bonding pad 16 is shown as layer **32*a* and, as may be clearly seen, this gold substantially thickened the bonding pad 16. Similarly, the gold layer 32*b* thickened the permalloy bonding pad 24**. It should be noted that these pads were thickened without a masking and etching step as is employed in the prior art, but rather with a washing step. A washing step does not significantly effect yield as do masking and etching steps.

Thus, a process has been disclosed for thickening the bonding pads in a magnetic bubble device. The process is a substantial improvement over the prior art in that a simple, reliable, washing step replaces a masking and etching step.

We claim:

1. In a magnetic bubble device which includes a layer of magnetic material in which magnetic bubbles are moved and a metal layer covered except for an exposed region by an overlying protective layer, a process for increasing the thickness of said exposed region comprising the steps of:

forming a layer of gold over said protective layer and over said exposed region;

washing said layer of gold from said protective layer but not from said exposed region;

whereby the thickness of said exposed region is augmented by a layer of gold without an additional masking and etching step.

2. The process defined by claim 1 wherein said washing of said layer of gold comprises the washing of said layer of gold with water.

3. The process defined by claim 1 wherein said washing step comprises the spraying of said layer of gold.

4. The process defined by claim 1 wherein said washing step comprises subjecting said layer of gold to an ultrasonic bath.

5. In a magnetic bubble device which includes a first layer of material in which magnetic bubbles are moved and a second layer disposed above said first layer, said second layer defining bonding pads, a process for preparing said device for probe testing or bonding comprising the steps of:

forming a protective layer over said second layer;

etching said protective layer to expose said bonding pads underlying said protective layer;

forming a gold layer on said protective layer and on said bonding pads;

washing said gold layer from said protective layer;

whereby gold remains on said bonding pads, thereby thickening them before probe testing or bonding.

6. The process defined by claim 5 wherein said washing step comprises the spraying of said gold layer.

7. The process defined by claim 5 wherein said washing step comprises subjecting said gold layer to an ultrasonic bath.

8. The process defined by claim 5 wherein said washing step comprises washing said gold layer with water.

9. The process defined by claim 5 wherein said forming of said protective layer comprises the forming of a polyimide layer over said second layer.

10. In a magnetic bubble device which includes a layer of material in which magnetic bubbles are moved, a first layer having first bonding pads covered by an insulative layer and a second layer disposed on said insulative layer having second bonding pads, a process for preparing said device for probe testing or bonding, comprising the steps of:

forming a polyimide layer over said insulative layer, second layer and second bonding pads, thereby exposing said second bonding pads;

etching said insulative layer in said region of said first bonding pads, thereby exposing said first bonding pads;

forming a gold layer over said polyimide layer and said first and second bonding pads;

washing away said gold layer from said polyimide layer;

whereby said first and second bonding pads are thickened by said gold layer, thereby making them more suitable for probe testing or bonding.

* * * * *